Jan. 12, 1932. H. J. ROUND 1,840,794
SOUND RECORDING SYSTEM
Filed Jan. 28, 1931
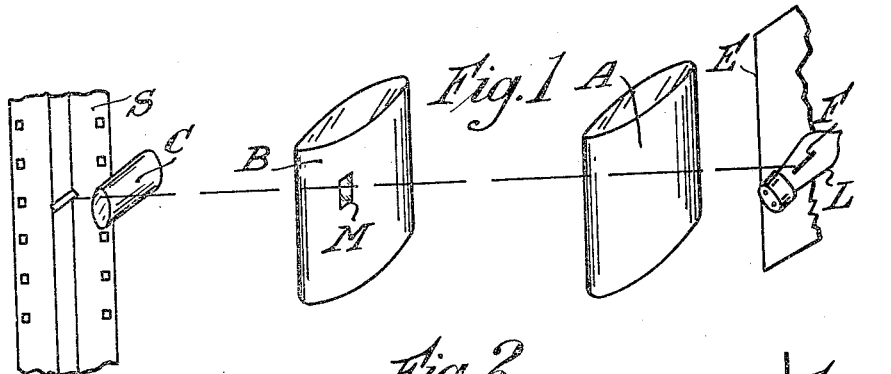
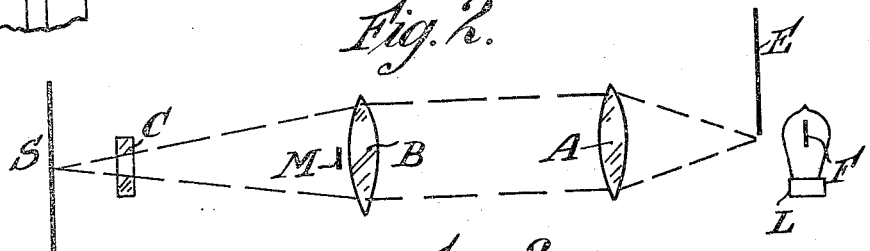
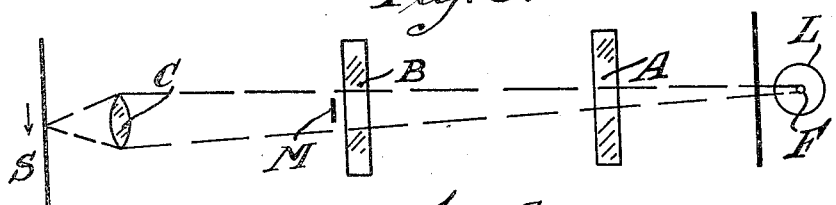
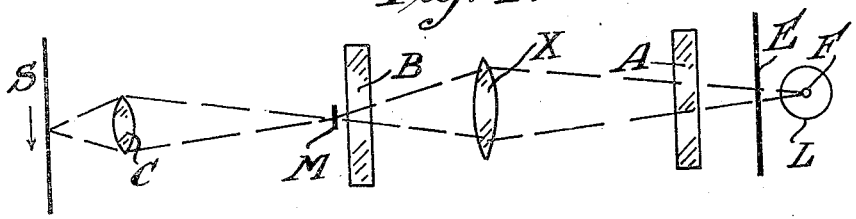
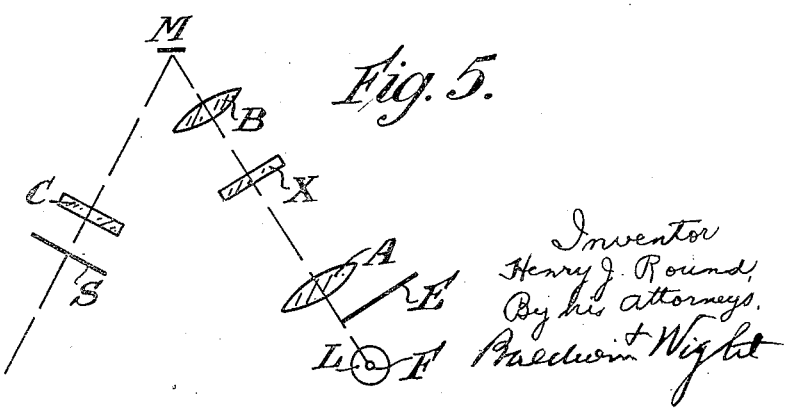
Inventor
Henry J. Round,
By his attorneys.
Baldwin Wight Patented Jan. 12, 1932

1,840,794

UNITED STATES PATENT OFFICE

HENRY JOSEPH ROUND, OF LONDON, ENGLAND, ASSIGNOR TO MARCONI'S WIRELESS TELEGRAPH COMPANY, LIMITED, OF LONDON, ENGLAND

SOUND RECORDING SYSTEM

Application filed January 28, 1931, Serial No. 511,905, and in Great Britain January 23, 1930.

This invention relates to sound recording systems and more particularly to systems for recording sound upon films.

The invention has for its principal object to provide an improved optical sound recording system employing cylindrical lenses which shall be of high optical efficiency and which shall be so constructed as to permit all the focusing and other optical adjustments required in practice to be made independently easily and quickly. Sound recording systems employing optical systems including cylindrical lenses have been previously proposed but in such systems as at present known it is not possible to make all the various focusing and other adjustments independently of one another. In sound recording systems employing a slit of light for example it is in practice desirable to be able to adjust the slit both for width and length to a close degree of accuracy and to obtain accurate focus for all such adjustments. The present invention as compared to known cylindrical lens optical systems as employed hitherto for sound recording presents the very important practical advantage that the adjustments can be effected independently of one another thus greatly simplifying operation and setting up of apparatus.

The invention is particularly intended for application to sound recording systems of the kind in which sound is recorded upon film by means of an acoustically vibrated recording "slot" of light which is caused to vibrate in the direction of its own length and at right angles to the direction of travel of a moving film to make a so called "variable area" sound track. Although the invention is obviously not limited to this particular method of recording, it may be very advantageously applied thereto and will be particularly described with reference to its application thereto.

According to this invention an optical system for use in recording sound upon film comprises a source of light, a cylindrical lens system of focal length adapted to focus the recording area of light (e. g. a recording slot) on the film to a required dimension in one direction and a further cylindrical lens system at right angles to the first and adapted to focus the recording area of light to a required dimension in a direction perpendicular to that of the first dimension, said second mentioned lens system being a double system including two lens units one of which causes the light to form a parallel or approximately parallel sided beam and the other of which reconcentrates the light to a focus on the film.

In the most usual case the first mentioned cylindrical lens system will be a horizontal system and will focus the slot of light as regards its breadth while the double system will be a vertical one and will focus the slot as regards length. (In this connection "breadth" means the small dimension of a slot i. e. the dimension in the direction of film travel, and "length" the perpendicular dimension.)

The present invention thus enables the co-ordinate dimensions of a recording area of light to be independently and separately focused as desired. To put the matter in another way the present invention provides optical means whereby the length and breadth of a source of light may be altered to a desired amount and the breadth similarly to a desired amount quite independently of one another.

It will be seen that the present invention enables the employment in an electric lamp source of light of a filament which may, in practice, be of any convenient size.

If the arrangement is such that the foci due to focusing in terms of length and focusing in terms of breadth are obtained in the same place an ordinary lens may be employed in addition anywhere in the system to reduce or magnify the result.

In cases in which a sharp end is required to the "slot image" an obstructing edge may be arranged near the source of light and a cylindrical lens system employed to focus this edge sharply instead of focusing the filament. Such a sharp edge may be constituted by the edge of a small plate located within the lamp bulb if necessary. It will be appreciated that the employment of such a plate avoids the difficulty that the ends of a slotted filament in an electric lamp are usually indefinite from the optical point of view.

The invention is illustrated in the accompanying drawings in which Figure 1 shows in schematic perspective one arrangement in accordance with the invention and adapted to project an intense light slot about 1 mil in breadth and 100 mils in length; Figure 2 is a plan view of the arrangement shown in Figure 1 i. e. the film should be assumed to be travelling at right angles to the plans of the paper; Figure 3 is a view taken at right angles to Figure 2, the film moving as indicated by the arrow; Figure 4 shows a modified arrangement viewed from the same angle as that assumed for Figure 3; Figure 5 is a view taken at right angles to Figure 4 and modified so as to show the various optical elements in positions approximating to a practical arrangement instead of all in the same straight line. In Figures 1 to 4 the various elements have been shown as all in the same straight line for the sake of simplicity.

Referring to Figures 1 to 3 there is provided a source of light consisting of an electric lamp L having an incandescent filament F which may be say 40 mils in diameter and 300 mils in length. The filament is shielded or masked in part by a plate E having a sharp edge said plate being placed conveniently near the lamp at a distance of, say, 2 to 3 inches. A 6-inch focus cylindrical lens A with its axis vertical is employed to project light from the filament into a parallel or approximately parallel sided beam and a second similar lens B is used to focus the said parallel beam. A third cylindrical lens C of very short focal length (say ½-inch) is now arranged with its axis horizontal so as to reduce the strip of light proceeding from the lens B to a slot of required breadth upon the film S. If the source of light be placed about 20-inch from the third cylindrical lens and the latter about ½-inch from the screen, the result obtained will be an intensely illuminated slot image about 1 mil in breadth.

With this arrangement very easy and independent adjustment of breadth and length of the light slot may be effected. The lamp may, if necessary, be moved away from or towards the film S, the members A. E and F being moved together and slight adjustments of member C may be made alone. In this way accurate focussing in both the horizontal and vertical planes may be obtained and the breadth of the image may be controlled accurately.

In the foregoing description the oscillograph mirror or other device for acoustically vibrating the light slot across the film has been disregarded. Now since the oscillograph mirror will oscillate only about an axis such as will cause the slot of light to vibrate in one direction (in the present instance across the film) it may be regarded as though it were merely an aperture as respects the dimension parallel to the axis of oscillation, though as regards the perpendicular dimension it obviously can not be so regarded owing to its oscillation. In Figures 1 to 3 the mirror is represented at M and it will at once be apparent that, regarding the mirror as an aperture as to the dimension indicated, the maximum utilization of light may not always be obtained, where a very small mirror is employed, by arrangements as shown in the said Figures 1 to 3. For example it will be seen that in Figure 3 the mirror M does not extend right across, and therefore does not utilize all the available light in, the beam from B to C; i. e. the aperture of the lens C exceeds the aperture-equivalent dimension of the mirror M. This disadvantage can be obviated by adopting the modification shown in Figures 4 and 5 in which a further cylindrical lens X is interposed said lens serving to concentrate the light (as regards the appropriate dimension of the beam, of course) upon the mirror M. This arrangement enables large aperture concentration lenses to be employed while still retaining a high optical efficiency with the use of small mirrors.

What I claim is:—

1. In a system for recording sound upon photographically sensitive film by means of a small light area, a light source, a light sensitive film, an optical system of the cylindrical lens type for focusing the recording area of light onto the film to a required dimension in one direction and a further cylindrical lens system at right angles to the first for focusing said recording area of light to a required dimension in a direction perpendicular to said first dimension, said further cylindrical lens system comprising a double system including two lens units, one lens unit being constructed to render the light from the source approximately parallel, and the other lens unit being constructed to reconcentrate said light to a focus on the film whereby said small light area may be focused or adjusted independently as regards two different mutually perpendicular dimensions thereof on the film.

2. In a system for recording sound upon photographically sensitive film by means of a small light slot, a light source, a light sensitive film, an optical system of the cylindrical lens type including a horizontal cylindrical lens system for focusing said recording slot to a required breadth upon the film and a vertical cylindrical lens system for focusing the light slot to a required length on said film, said vertical cylindrical lens system comprising a double system including a first lens unit constructed to concentrate the light from said source to a parallel or approximately parallel beam, and a second lens unit constructed to reconcentrate the light to a focus on the film whereby the light slot may be focused or adjusted independently as regards length and breadth on the film.

3. In a system for recording sound upon photographically sensitive film by means of a small light area, a light sensitive film, a light source, an optical system of the cylindrical lens type, a masking edge associated therewith, a cylindrical lens system for focusing the recording area of light on the film to a required dimension in one direction, and a double cylindrical lens system at right angles to the first for focusing said recording area of light to a required dimension in a direction perpendicular to said first dimension, said double lens system including two lens units, one lens unit being constructed to render the light from the source approximately parallel, and the other lens unit being constructed to reconcentrate said light to a focus on the film whereby said small light area may be focused or adjusted independently as regards two different mutually perpendicular dimensions thereof on the film.

4. In a system for recording sound upon photographically sensitive film by means of a small light recording slot, a light source, a light sensitive film, an optical system of the cylindrical lens type, a masking edge associated with said source of light, a horizontal cylindrical lens system for focusing said recording slot to a required breadth upon the film and a vertical cylindrical lens system for focusing the light slot to a required length on said film, said vertical cylindrical lens system comprising a double system including a first lens unit constructed to concentrate the light from the said source to an approximately parallel beam, and a second lens unit constructed to reconcentrate the light to a focus on the film whereby the light slot may be focused or adjusted independently as regards length and breadth on the film.

5. In a system for recording sound upon photographically sensitive film by means of a small light area, an optical system of the cylindrical lens type and comprising in combination a source of light, a masking edge associated therewith, a light sensitive film, a cylindrical lens system for focusing the recording area of light on the film to a required dimension in one direction, and a further cylindrical lens system at right angles to the first for focusing said recording area of light to a required dimension in a direction perpendicular to said first dimension, said last mentioned cylindrical lens system being a double system including two lens units, one constructed to render approximately parallel the light from the source, and the other constructed to reconcentrate said light to a focus on the film, an oscillograph mirror for vibrating the recording area of light in correspondence with the sound to be recorded means for concentrating available light upon said mirror as regards that dimension thereof which may be regarded as a fixed aperture, and means for moving the film past the recording light area.

6. In a system for recording sound upon photographically sensitive film by means of a small light slot, an optical system of the cylindrical lens type and comprising in combination a source of light, a light sensitive film, a horizontal lens system for focusing said recording slot to a required breadth upon the film, and a double vertical lens system for focusing the light slot to a required length on said film, said vertical cylindrical lens system comprising a double system including a first lens unit constructed to concentrate the light from said source to a parallel or approximately parallel beam, and a second lens unit constructed to reconcentrate to a focus on the film whereby the light slot may be focused or adjusted independently as regards length and breadth, an oscillograph mirror for vibrating the recording slot of light in correspondence with the sound to be recorded, and means for concentrating available light upon said mirror as regards that dimension thereof which may be regarded as a fixed aperture.

7. In a system for recording sound upon photographically sensitive film by means of a small light recording slot, a source of light, a light sensitive film, an optical system of the cylindrical lens type, a horizontal lens system for focusing said recording slot to a required breadth upon the film, a double vertical lens system for focusing the light slot to a required length on said film and a spherical lens interposed in the path of the light, said vertical cylindrical lens system comprising a double system including a first lens unit constructed to concentrate the light from said source to a parallel or approximately parallel beam, and a second lens unit constructed to reconcentrate the light to a focus on the film whereby the light slot may be focused or adjusted independently with respect to the length and breadth thereof.

8. A system for recording sound upon photographically sensitive film by means of a small light slot including an optical system of the cylindrical lens type and comprising in combination a source of light, a film, a masking edge associated therewith, a horizontal lens system for focusing the light slot to a required breadth upon the film, a double vertical lens system for focusing the light slot to a required length on said film, said double vertical lens system including a first lens unit constructed to concentrate the light from said source to a parallel or approximately parallel beam, and a second lens unit constructed to reconcentrate the light to a focus on the film, an oscillograph mirror for vibrating the slot of light in correspondence with the sound to be recorded, an additional horizontal cylindrical lens for concentrating available light upon said mirror as regards that dimension thereof which may be regarded as a fixed aperture, a simple magnifying or reducing spherical lens disposed in the path of the light, and means for moving the film past the recording light area.

In testimony that I claim the foregoing as my invention I have signed my name this 16th day of January, 1931.

HENRY JOSEPH ROUND.